Patented June 7, 1949

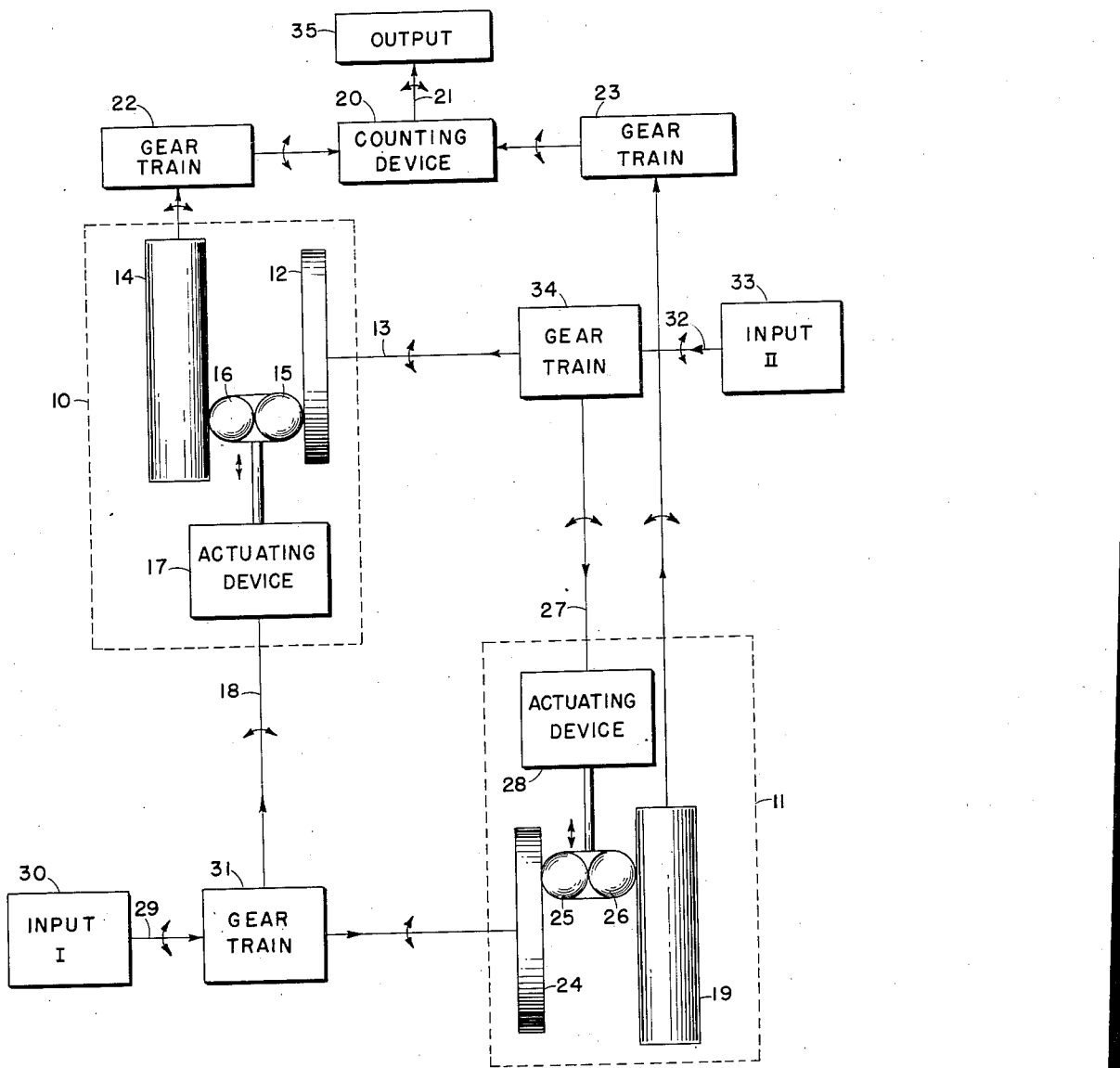

2,472,097

UNITED STATES PATENT OFFICE 2,472,097

MULTIPLYING MECHANISM

Charles H. Doersam, Jr., Palisade, N. J.

Application February 15, 1946, Serial No. 647,983

3 Claims. (Cl. 74—675)

(Granted under the act of March 3, 1883, as amended April 30, 1928; 370 O. G. 757)

This invention relates to computing mechanisms and in particular to a multiplying mechanism of simple construction and capable of producing accurate results over a wide and variable range of input quantities.

In many instances it is desirable to have a computing mechanism capable of multiplication operation over a large input range. Multiplying systems that have hitherto been available have had limited applicability because, in many instances, the complexity of gearing necessary for operation limited the accuracy of results in certain ranges.

Accordingly it is an object of this invention to provide a computing mechanism operable over a wide input range with accuracy.

Another object of this invention is to provide a multiplying mechanism of simple construction operable over a wide range.

Other and further objects and features of the present invention will become apparent upon a careful consideration of the following detailed description when taken together with the accompanying drawing the single figure of which illustrates a typical embodiment of the invention and the manner in which that embodiment may be considered to operate.

In accordance with the fundamental concepts of the present invention, a multiplying mechanism is provided of simple construction and capable of multiplication of two input quantities which may be greater or less than unity. First and second variable ratio drive mechanisms are employed to produce in response to the input quantities first and second result quantities which are proportional, respectively, to the first and second input quantities. The input quantities are utilized in such a manner that the ratio between the input and output of the first drive mechanism is controlled by the second input quantity through suitable gearing and the ratio between input and output of the second drive mechanism is controlled by the first input quantity through additional suitable gearing. The first and second result quantities are counted in a suitable device, preferably of a differential nature to obtain a final output quantity which is the product of the two input quantities.

With reference to the figure, a computer mechanism constructed in accordance with the principles of the present invention is shown. This mechanism includes primarily the variable ratio drive mechanisms 10 and 11 which are similar in structure to the disc and ball integrators employed in gun-fire control apparatus. As typified by the drive unit 10, a disc member 12 is provided with rotary motion by the shaft 13. This motion is communicated to a cylinder 14 by means of ball members 15, 16 which are in contact therewith. Cylinder 14 is capable of rotational motion about a longitudinal axis in the plane of the figure. Rotation of disc member 12 causes rotation of ball 15 about an axis substantially parallel to that of cylinder 14. This rotation of ball 15 is in turn communicated to ball 16 which also revolves about an axis substantially parallel to that of cylinder 14. Rotation of ball 16 then causes rotation of cylinder 14. The ratio of the drive mechanism, which is defined as the ratio of the number of revolutions of cylinder 14 produced by one revolution of disc member 12, can be adjusted at will by changing the radial displacement of balls 15, 16 from the center of disc 12. With balls 15, 16 near the center of disc 12, this ratio is small and may be zero. With balls 15, 16 near the outer periphery of disc 12, the ratio is large. This ratio may be altered in direct proportion to an alteration in the displacement of balls 15, 16 from the center of disc 12. An actuating device 17 is employed to translate rotary motion of a shaft 18 into motion which will vary the radial distance of the balls 15, 16 from the center of disc 12. For example, device 17 could take the form of a worm-driven lead screw arrangement somewhat similar to that shown by the patent to Chafee et al. 2,206,875 issued July 9, 1940.

Rotation of cylinder 14 and a similar cylinder 19 in the drive mechanism 11 is counted in a suitable device 20 which is preferably of a differential type adapted to provide an output rotation of shaft 21 which is proportional to the sum of the rotation of cylinders 14, 19. This motion of cylinders 14 and 19 is communicated preferably through gear trains 22, 23 which may include reduction gears and bevel gears.

It is to be noted that although the variable drive devices 10, 11 are shown diagrammatically, the components thereof are placed in suitable supporting frameworks which provide mounting support at the ends of cylinders 14, 19 and for the disc 12, 24. Slidable mounting not shown, is provided for balls 15, 16 and balls 25, 26 which are operated through the actuating devices 17, 28, respectively, by rotation of shafts 18, 27.

A first input quantity is supplied to a first input shaft 29 from an input fixture 30. Rotation of shaft 29 is supplied to disc 24 of drive 11 through a gear train 31 which may include reduction gearing or simply direct drive of disc 24. The first input quantity is also supplied through shaft 18 to the actuating device 17 which controls the position of balls 15, 16 and consequently the ratio of the drive mechanism 10.

A second input quantity is supplied to a second input shaft 32 from an input fixture 33. Rotation of shaft 32 is applied to disc 12 of drive mechanism 10 through a gear train 34 which, as before, may provide reduction of the input quantity or direct drive of the disc 12. Similarly the second input quantity is employed to change the ratio of the variable ratio drive mechanism 11 through shaft 27 and the actuating device 28.

The rotation of cylinders 14, 19 is applied through gear trains 22, 23 to the counter 20. Counter 20 is preferably of a differential type adapted to receive two rotary input quantities and produce a rotary output quantity into shaft 21 which is proportional to the sum of the two rotary input quantities. This output quantity is obtained from fixture 35.

It is generally desirable that the gear trains 22, 23, 31, 34 include reducing gears if the rotational motion of shafts 29, 32 is large. This is desirable because the positions of balls 15, 16 and of balls 25, 26 may be altered only by a limited amount. Conversely it is desirable that multiplication of the angular quantities occur in units 22, 23, 31, 34 if the input quantities to shafts 29, 32 are small.

As description of the operation of the mechanism where used to multiply a factor of four by a factor of six with zero revolution alteration occurring in gear trains 22, 23, 31, 34 is as follows:

Starting with balls 15, 16 and 25, 26 at the center of the associated disc 12 and 24, a first input quantity of four revolutions is applied to shaft 29. This rotary motion moves balls 15, 16 away from the center of disc 12 to a position in which ball 15 is in contact with disc 12 at a point whose distance from the center of disc 12 is equal to four times the radius of cylinder 14. As this occurs, disc 24 goes through four revolutions.

The second input quantity (six) may then be applied to shaft 32. This motion moves balls 25, 26 away from the center of disc 29 to a position which is displaced from the center by an amount equal to six times the radius of cylinder 19.

Simultaneously, disc 12 goes through six revolutions to produce twenty-four revolutions of cylinder 14. This rotational quantity is applied to the differential counting device 20 to obtain an angular output quantity which is proportional to twenty-four. Although this action was described as occurring in time sequence with the occurrence of an input signal to shaft 32 following after the input signal to shaft 29, a similar action and output result would occur for simultaneous input of the quantities to shafts 29, 32. For example, assume that two revolutions is imparted to each of the input shafts 29 and 32 simultaneously, and that balls 15, 16 and 25, 26 are positioned initially at the center of their respective discs 12 and 24. Then during the first revolution the gear ratio of each of the devices 10 and 11 will increase from zero to unity. In other words the mean gear ratio of each of the devices 10 and 11 during this interval is equal to ½ due to the fact that the variable gear ratio mechanisms 10 and 11 have progressed from zero to a 1:1 ratio. Thus, at the end of the first revolution each of the cylinders 14 and 19 will have completed ½ revolution; which when combined in device 20 will sum up to one complete revolution of output shaft 21. During the second revolution, the gear ratio of each of the mechanisms 10 and 11 will increase from one to two at the end of the second revolution. The mean gear ratio of each mechanism during this interval is, accordingly, equal to one and one half. Thus, the second revolution rotates each of the drums 14 and 19 through one and one half complete revolutions; which when combined in device 20 sums up to three revolutions of the output shaft 21 in response to the second input revolution. The total rotation of shaft 21 therefore adds up to four revolutions since two revolutions have been imparted by each of the devices 10 and 11 or is equal to the product of the two simultaneous input quantities.

From the foregoing discussion it is apparent that considerable modification of the features of this invention are possible, and while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A multiplying system for obtaining an output quantity proportional to the product of two input quantities, comprising; means receiving the input quantities, a first variable ratio drive mechanism responsive to the first of said input quantities for producing a first result quantity proportional to the first input quantity, said first variable ratio drive mechanism also responsive to the second input quantity for controlling the proportion by which the first input quantity is changed in the first variable ratio drive mechanism, a second variable ratio drive mechanism responsive to the second of said input quantities for producing a second result quantity, proportional to the second input quantity, said second variable ratio drive mechanism also responsive to the first input quantity for controlling the proportion by which the second input quantity is changed in the second variable ratio drive mechanism, and counting means combining the first and second result quantities to produce an output quantity proportional to the sum of the first and second result quantities.

2. A multiplying system for obtaining an output quantity proportional to the product of two input quantities, comprising; means receiving the input quantities, a first variable ratio drive mechanism responsive to the first of said input quantities for producing a first result quantity proportional to the first input quantity, said first variable ratio drive mechanism also responsive to the second input quantity for controlling the proportion by which the first input quantity is changed in the first variable ratio drive mechanism, a second variable ratio drive mechanism responsive to the second of said input quantities for producing a second result quantity proportional to the second input quantity, said second variable ratio drive mechanism also responsive to the first input quantity for controlling the proportion by which the second input quantity is changed in the second variable drive mechanism, and differential type counting means combining the first and second result quantities to produce an output quantity proportional to the sum of the first and second result quantities.

3. A multiplying system for obtaining an output quantity equal to the product of a pair of simultaneous input quantities, comprising; first and second variable ratio drive mechanisms, means responsive to one of said input quantities to change, in direct proportion thereto, the ratio of said first variable ratio drive mechanism, means coupling the other input quantity to said first variable ratio drive mechanism to produce a first output quantity, means responsive to said other input quantity to change, in direct proportion thereto, the ratio of said second variable ratio mechanism, means coupling said one input quantity to said second variable ratio drive mechanism to produce a second output quantity, and means combining said first and second output quantities to produce a third output quantity equal to the sum of said first and second output quantities.

CHARLES H. DOERSAM, JR.

REFERENCES CITED

The following references are of record in the file of this patent:

UNITED STATES PATENTS

| Number | Name | Date |
| --- | --- | --- |
| 1,072,500 | Richardson | Sept. 9, 1913 |
| 2,206,875 | Chafee | July 9, 1940 |
| 2,251,155 | Neuhaus | July 29, 1941 |